United States Patent
Wilson et al.

(10) Patent No.: US 6,526,476 B2
(45) Date of Patent: *Feb. 25, 2003

(54) DEFECTIVE DATA SECTOR MANAGEMENT SYSTEM

(75) Inventors: Aaron Wade Wilson, Berthoud, CO (US); Wayne Aaron Thorsted, Longmont, CO (US)

(73) Assignee: STMicroelectronics N.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,685

(22) Filed: Feb. 26, 1999

(65) Prior Publication Data

US 2001/0044873 A1 Nov. 22, 2001

Related U.S. Application Data

(60) Provisional application No. 60/076,322, filed on Feb. 27, 1998.

(51) Int. Cl.[7] .............................................. G06F 12/00
(52) U.S. Cl. ........................ 711/112; 711/114; 711/165; 711/170; 711/173; 714/6; 714/7; 714/8; 369/275.3
(58) Field of Search ..................... 711/111–112, 170, 711/173, 114; 714/6–8; 369/275.3

(56) References Cited

U.S. PATENT DOCUMENTS

| | | | |
|---|---|---|---|
| 5,619,723 A | * 4/1997 | Jones et al. | 710/3 |
| 5,918,001 A | * 6/1999 | Ueno et al. | 714/8 |
| 5,974,544 A | * 10/1999 | Jeffries et al. | 713/1 |
| 6,034,831 A | * 3/2000 | Dobbek et al. | 360/53 |

* cited by examiner

Primary Examiner—Do Hyun Yoo
Assistant Examiner—Mehdi Namazi
(74) Attorney, Agent, or Firm—Lisa K. Jorgenson; William J. Kubida

(57) ABSTRACT a firm ware based technique related to managing defective data sector information in a disk drive. Specially, technique provides for a dynamic method by which the number of spare or served alternate sectors and their locations can be allocated in the event defective data sectors exist. One advantage of the present invention exists for certain applications where the capacity and/or configuration of the drive are configured at run time. The present invention also has the advantage of improving performance when accessing "grown" defects by allowing the block relocation information to be placed physically closer to the location of the defective blocks.

20 Claims, 4 Drawing Sheets

```
                                                R  R  R  R
PBA:  0  1  2  3  4  5  6  7  8  9  10 11 12 13 14 15 16 17 18 19
LBA:  0  1  2  3  4  5  6  7  8  9  10 11 12 13 14 15
```

FIG. 1

```
            S                          S                 R  R
PBA:  0  1  2  3  4  5  6  7  8  9  10 11 12 13 14 15 16 17 18 19
LBA:  0  1  2     3  4  5  6  7  8  9  10    11 12 13 14 15
```

FIG. 2

```
            S              R  R  R  S                          R
PBA:  0  1  2  3  4  5  6  7  8  9  10 11 12 13 14 15 16 17 18 19
LBA:  0  1  2     3  4  5  6        7     8  9  10 11 12 13
```

FIG. 3

```
            S              R  R  R  S                          R
PBA:  0  1  2  3  4  5  6  7  8  9  10 11 12 13 14 15 16 17 18 19
LBA:  0  1  2     3     5  6  4        7     8  9  10 11 12 13
```

|  | PBA OF BEGINNING OF AREA (HEAD, CYLINDEDR, SECTOR) | SIZE OF AREA IN BLOCKS |
|---|---|---|
| AREA 1 | 0, 0, 0 | 10 |
| AREA 2 | 1, 2000, 0 | 5 |
| AREA 3 | 2, 4000, 0 | 5 |
| AREA 4 | 3, 0, 400 | 20 |

FIG. 6

DEFECTIVE DATA SECTOR MANAGEMENT SYSTEM

This application claims priority from U.S. Provisional Patent Application No. 60/076,322, filed on Feb. 27, 1998, the contents of which are incorporated herein by reference.

FIELD OF THE INVENTION

The present invention relates to the field of disk drives, and in particular, to a method and system for managing defects in a disk drive system.

BACKGROUND OF THE INVENTION

Modern disk drive systems include multiple disks or platters (known as the disk media) on which data is stored magnetically. Virtually all disk drive media has some defective areas where it is impossible to reliably record (write) or play back (read) data that has been previously recorded. A standard feature of disk drives is to implement some type of defect management scheme, which is designed to avoid these defective areas for the purpose of read/write transfers.

One of the common defect management techniques employed is to simply "slip" defective blocks. This means that in the logical order of how blocks are transferred, certain blocks are simply skipped over. For example, assuming that all blocks on a disk drive have a physical block address (PBA), and all user blocks of the same disk drive have a logical (user) block address (LBA), a drive may be laid out as shown in FIG. 1. In this simplified example, the drive has 20 physical blocks (0 through 19) and 16 user blocks (0 through 15). Therefore, up to four blocks can be slipped. The remaining blocks denoted as "R" are reserved for these slips.

To slip a block means to alter the LBA to PBA mapping function such that the PBA block has no LBA, and therefore will not be part of a user transfer. Assuming PBAs 3 and 12 are found to be defective and slipped, the PBA to LBA relationship now becomes as shown in FIG. 2. The blocks denoted with "S" are the slipped defective blocks, and the blocks denoted "R" are still available for slips.

The major advantage of block slipping is that it introduces minimal performance loss. A multiple sector transfer is only interrupted by a slipped block for the amount of time it takes to go past the slipped block. However, since the slipping of a defective block causes a different logical to physical relationship for all blocks after that defective block, and user data is expected to remain at a given logical block address, this technique requires the moving of all user data after a defective block has been slipped. This is a dangerous procedure since user data can be lost if there is a power or software failure, and furthermore, the time it takes generally makes the procedure prohibitive in the user environment. Therefore, this technique is rarely employed for defects found after the factory test process. It is most commonly used to identify and de-allocate the initial defects on the media before any user data is stored.

Sometimes, additional defects will appear after the factory test process, either due to incomplete defect finding in the factory, defects created because of shock or contamination, or due to environmental conditions or degradation of the magnetics after the disk drive has been placed into service. These defects are commonly referred to as "grown" defects. Since the block slipping technique has the disadvantage of requiring that user data be moved after the slipping operation, typically an alternate method of defect management is employed for grown defects. A common technique is to relocate all transfers directed to a block with a grown defect to an alternate known good block. A few common terms for this technique are "alternating", "relocating" or "reassigning" a defect.

With this relocating technique, one or more groups of contiguous PBAs are reserved for use as alternate destinations. When a block is relocated, an association is made between it and one of the reserved blocks. Transfers directed to that defective block will thereafter be redirected to the reserved alternate destination block instead. This technique does not affect the physical location of any other user blocks, and therefore it is more suitable for defects found in the field. It has the disadvantage of slower access when the relocated block is part of a multiple block transfer, since a seek operation and/or extra disk revolution(s) are required to get to the alternate block.

FIG. 3 shows an example relationship between PBAs and LBAs with both slipping and a reserved alternate area for future relocations. In this case, PBAs 8, 9, and 10 are the reserved alternate area. PBAs 3 and 12 have been slipped. PBA 19 remains available as an alternate area should another block need to be slipped. If, for example, LBA 4 was determined to be defective and in need of relocation, the mapping would change to look like that shown in FIG. 4. Note that in FIG. 4, the technique requires the relocation of only the defective block. Other user blocks are not affected. However, any multiple block transfer that includes LBA 4 must now transfer the blocks out of order, which may entail a seek operation and/or extra disk revolutions, and will degrade performance. Also, any multiple block transfer that is interrupted by the area reserved for alternate destination blocks will incur a performance loss.

Three important factors to consider when implementing a block relocation defect management scheme are the size, location, and number of the areas reserved for alternate destinations. The criteria upon which design decisions are made may include: (1) the disk capacity and expected number of grown defects per unit of capacity; (2) the maximum seek length required to access a relocated block; and (3) the likelihood that the area reserved for alternate destinations will interrupt a multi-block transfer.

The problem is that these parameters are highly dependent on the capacity of the drive and the configuration of the drive (cylinders, heads, sectors, recording zones, frequencies, usable radius and so forth), and many disk drives implement some or all of these parameters in a dynamic fashion. For example, it is common practice for a disk drive manufacturer to produce a line of disk drive products, each model using substantially the same design, but containing a different number of recording heads and/or disks to provide varying capacities to allow the manufacturer to sell the different products at different price points. Lower capacity models are often referred to as "depopulated" disk drives. It is still advantageous, however, to use a common electronics and firmware set for all of the different products, because it simplifies the build process, reduces time to market, and reduces costs. It therefore becomes a requirement of the firmware that it can adapt itself to the capacity of the specific model into which it is installed.

It is also common practice in the disk drive industry to depopulate a disk drive without actually removing any heads or platters. This typically happens in the factory test process when it is determined that a given recording head and surface does not meet specifications, and is therefore unsuitable for the storage of user data. In this case, the disk drive is sold as a lower capacity model. Typically, the test process will record in non-volatile memory on the disk drive (usually the disk) which surface or surfaces are not to be used. The disk drive firmware must be designed to check this non-volatile memory and automatically adjust itself to the depopulated configuration. The alternative would be to change the firmware to a set that specifically avoids the bad surface(s), however, as mentioned above, this adds manufacturing cost because multiple firmware sets must be created and supported.

Similarly, a practice sometimes used is to "short stroke" a disk drive that cannot reliably read and write at the extreme radius of a given surface, thus reducing capacity by not using the outer areas of the media. Instead of not using the entire surface, only a portion of the given surface is unused. Again, the firmware typically must detect this and not use the entire radius of the defective surface, so that the drive can be sold as a lower capacity model.

Another common practice in the disk drive industry is for the factory test process to detect the maximum bit density at which each installed head/media combination is capable of operating, and to dynamically adjust certain recording parameters such as the radius at which recording frequency zone boundaries are placed. This is often referred to as "adaptive zoning". This results in a different number of physical and user blocks on different surfaces, and potentially a different capacity on the entire drive, which may or may not be sold as a different model depending on it's final capacity. In this case, the firmware must detect the configuration as determined in the factory test process and adapt itself to it.

Removable media disk drives are often required to support older, lower capacity versions of the media. Often, the drive must spin up and read from some reserved areas before the capacity and configuration of the media is known. In existing systems, when adapting to the capacity or geometry of a given disk drive, the firmware does not adapt the number, size, or locations of areas reserved for alternate reassignments, it simply uses the values for one of the possible capacity models. This results in a sub-optimum defect management scheme in terms of the number, size, and locations of reserved alternate areas.

There exists a need for a block relocation-type defect management scheme whereby the size, location, and number of reserved alternate areas can be configured dynamically when the capacity and/or configuration of the disk drive is determined. It is against this background, and the desire to solve the problems of and improve on the prior art, that the present invention has been developed.

SUMMARY OF THE INVENTION

The present invention relates to a method for configuring reserved alternate areas in a disk drive system for relocations of blocks thereto. The method includes: spinning up the disk drive system, determining the configuration of the disk drive system; determining the number, size, and location of the reserved alternate areas; and storing the number, size, and location of the reserved alternate areas in memory.

The operation of determining the configuration may include determining a capacity of the disk drive system. The operation of determining the configuration may include determining information about the number and location of read/write heads in the disk drive system. The operation of determining the configuration may include detecting the number of read/write heads in the disk drive system. The operation of determining the configuration may include reading configuration information from memory associated with the disk drive system. The operation of determining the configuration may include reading an externally configurable input. The operation of determining the configuration may include receiving information from a host computer.

The operation of determining the number, size, and location of the reserved alternate areas may include scaling the size to the capacity of the disk drive system. The operation of determining the number, size, and location of the reserved alternate areas may include placing at least one reserved alternate area on each recording surface of the disk drive system. The operation of determining the number, size, and location of the reserved alternate areas may include varying the size of the reserved alternate areas depending upon the radial location of the areas on disk media of the disk drive system. The information can be stored in the form of a table. The method may further include factoring the stored information in memory into address calculations. The operation of factoring may include a fixed routine that can perform the factoring based on the information stored in the table. The method may further include factoring the stored information in memory into address calculations.

BRIEF DESCRIPTION OF THE DRAWINGS

FIG. 1 is a diagram of a mapping of Logical Block Addresses to Physical Block Addresses, showing reserved areas for slips.

FIG. 2 is a diagram of a mapping of Logical Block Addresses to Physical Block Addresses, showing slipped blocks.

FIG. 3 is a diagram of a mapping of Logical Block Addresses to Physical Block Addresses, showing slipped blocks and reserved alternate areas.

FIG. 4 is a diagram of a mapping of Logical Block Addresses to Physical Block Addresses, showing slipped blocks and blocks that have been relocated into the reserved alternate areas.

FIG. 6 is a table stored in memory associated with the disk drive system of FIG. 5, showing the number, size, and location of reserved alternate areas.

DETAILED DESCRIPTION OF THE PREFERRED EMBODIMENT

Figure 5:
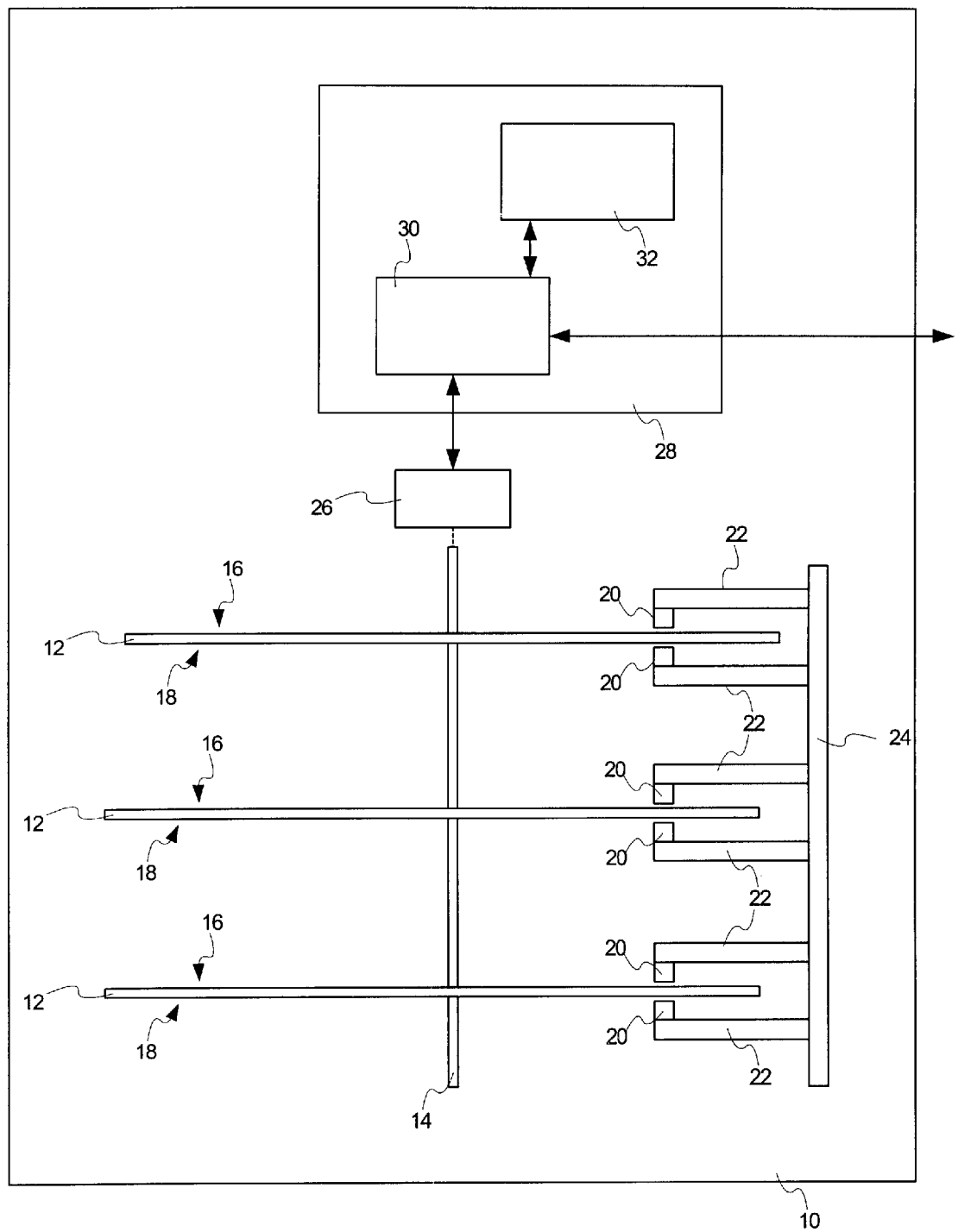
FIG. 5 is a simplified block diagram of a disk drive system of the present invention.

The present invention includes a block ordering system implemented in a disk drive system 10, shown in FIG. 5. The disk drive system 10 includes a plurality of platters 12 attached to a spindle 14. Each platter 12 has an upper surface 16 and a lower surface 18. Corresponding to each surface 16 and 18 is one of a plurality of read/write heads 20 supported by an arm 22 of an actuator 24. The platters 12 are spun via the spindle 14 by a motor 26. Control circuitry 28 controls the motor 26, the actuator 24, and the transfer of data to and from the read/write heads 20. The control circuitry 28 includes a microprocessor 30 having firmware associated therewith and stored in memory device 32.

Stored within the firmware associated with the microprocessor 30 is a data structure or table 40 (FIG. 6) into which data about the number, position (location), and size of reserved alternate areas on the disk media (platters) can be stored. As can be seen, the table 40 includes an entry or row for each of a plurality of reserved alternate areas in the disk media. For ease of explanation, the table 40 of FIG. 6 is simplified, having only four areas. For each of the areas, there are at least two pieces of data. First is the Physical Block Address (PBA) of the beginning of the reserved alternate area. In the table 40 of FIG. 6, the PBA is expressed in the form of a head number, a cylinder number, and a sector number. Alternatively, the PBA could be expressed in some other data format such as sequential block numbers. The second piece of data for each of the reserved alternate areas is the size of the reserved alternate area, in blocks. Alternatively, of course, the size could be expressed in some other parameter other than in blocks.

Those skilled in the art will recognize that there are many ways to provide the necessary data in a table, in terms of different ways of organizing the data, different ways of representing an address, different ways of representing the size, different ways of specifying the number of reserved alternate areas (such as a separate memory element), and so forth. Furthermore, it is within the scope of this invention to implement this technique in a fashion that is not entirely run-time configurable, but instead only the location of the areas may be run-time configurable, while the number and size of the areas may be fixed.

In the example explained in more detail herein, the optimum locations and sizes of each of the reserved alternate areas, as well as the optimum number of reserved alternate areas, are determined by the firmware. This determination is based on the capacity and/or the configuration of the disk drive, values that may not be known until after the initial spinup operation and other operations to determine said capacity and configuration. The firmware calculates the optimum location and sizes of the reserved alternate areas and records that information in the table 40. Thereafter, the table 40 is used by the firmware when performing address calculations, such as calculating the location of a given user block at which a read or write request is directed.

Those skilled in the art will recognize that the determination of the optimum locations, sizes, and number of reserved alternate areas need not necessarily be calculated by the firmware at run-time or in normal operation based on drive capacity or configuration, but may instead be calculated by the firmware or by a host PC or by an operator prior to using the disk drive (for example, during the factory test process), and then recorded on the disk or in another non-volatile storage device. The firmware's run time requirement in the user environment with this type of design would be to retrieve the values from this non-volatile storage and load them into the RAM areas for ready access in performing the address calculations. This does not alter the basis of the invention, however, which is that the values are made configurable so that a common firmware set supports multiple configurations.

Figure 7:
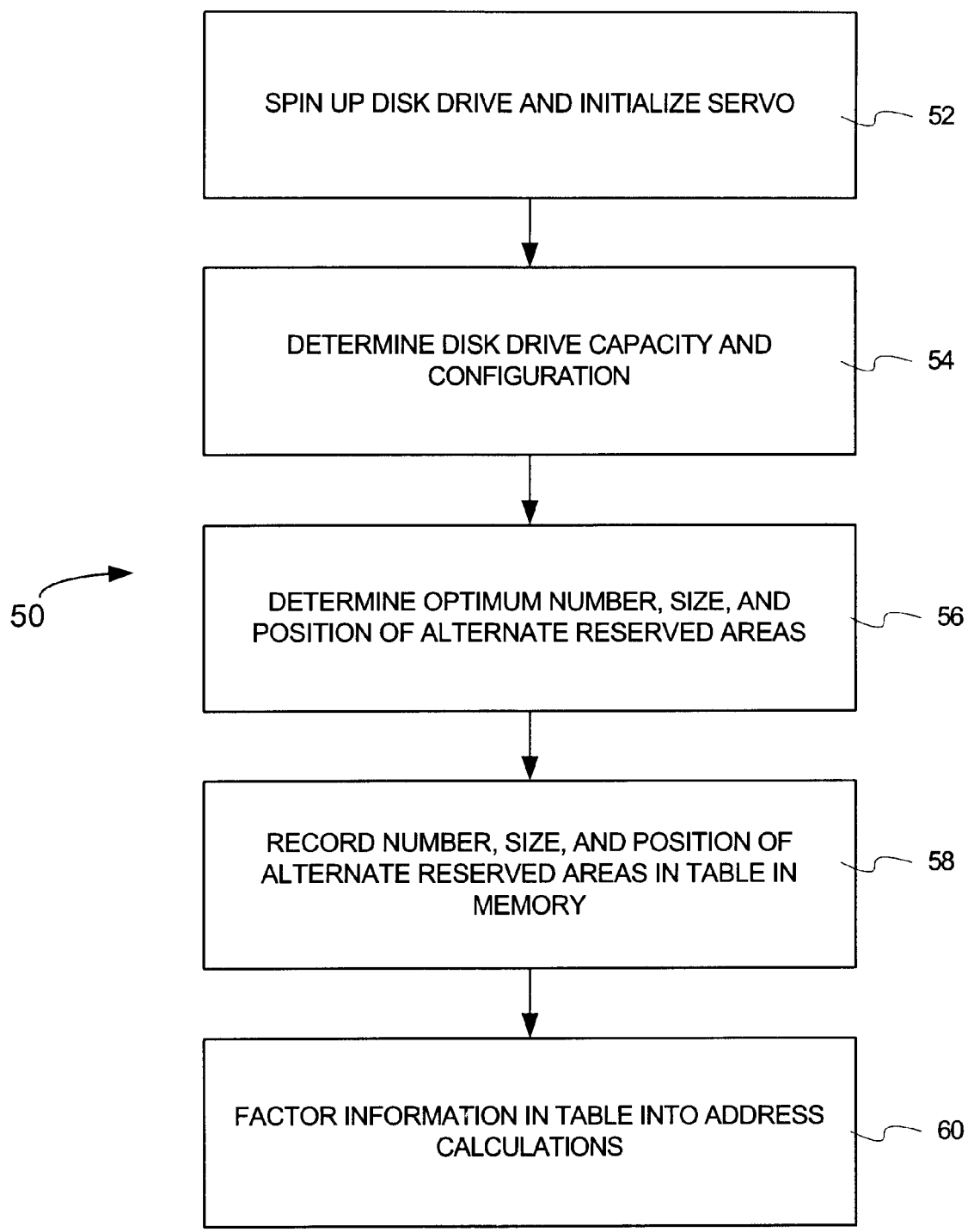
FIG. 7 is a flowchart of the process flow followed by firmware within control circuitry of the disk drive system of FIG. 5 in configuring the system for reserved alternate areas.

An example of an algorithm for implementing the present invention in the disk drive system 10 will now be discussed, with reference to the flow chart 50 of FIG. 7. First of all, the disk drive system 10 spins up the platters 12 via the spindle 14 and the servo is initialized (52). Next, the disk drive system 10 must determine (54) its capacity and/or configuration. This can be done by performing one or more of the following steps: (1) the disk drive system 10 could read its capacity or an element of its capacity from a reserved area in the media; (2) the disk drive system 10 could detect the number of read/write heads 20; (3) the disk drive system 10 could read a jumper or other externally configured input; or (4) the disk drive system 10 could receive the information about capacity and configuration from a host computer.

Next, the disk drive system 10 must determine (56) the optimum number, size, and position of the alternate reserved areas based on the capacity, configuration, and requirements of the disk drive system 10. Some typical decision criteria may include: (1) minimization of head switches, possibly requiring at least one reserved area per surface; (2) minimization of seek times, possibly requiring one reserved area in the center of one or more surfaces; (3) minimization of seek times, possibly requiring a particular quantity of reserved areas so that a specific maximum seek length is never exceeded; (4) maximization of non-relocated transfer speeds, possibly requiring reserved areas to be located outside of the range of user blocks so as to eliminate interruption of non-relocated transfers; (5) a size that scales to the capacity of the disk drive system 10 (e.g., one reserved block per megabyte of capacity); (6) a size that is variable depending on the radius at which the area is placed on the media, because of the corresponding likelihood of nearby grown defects; and/or (7) reading a predetermined number of reserved areas, size, and/or position from a non-volatile storage device.

Figure 8:
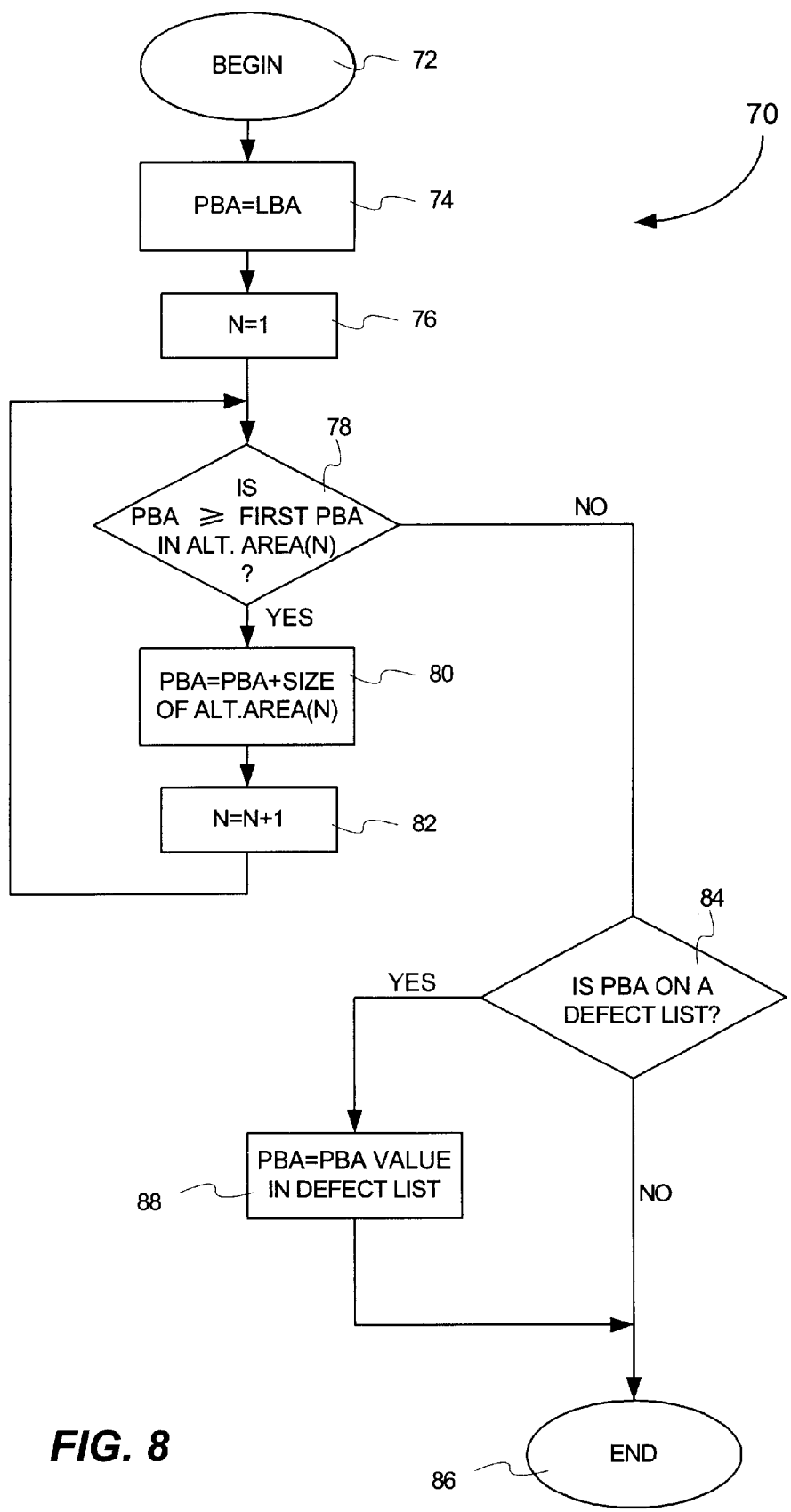
FIG. 8 is a flowchart of the process flow followed by firmware within control circuitry of the disk drive system of FIG. 5 in performing address calculations.

Once the optimum number, size, and position of the alternate reserved areas has been determined, this information is then recorded (58) in the table 40 in memory. Lastly, the information in the table 40 is factored (60) into the address calculations. Further detail on the step 60 is provided in a flow chart 70 shown in FIG. 8.

For this example, it is assumed that the LBA and PBA addresses are in the same format. With this assumption, and further assuming that the block slipping approach is not also implemented, the process begins at step (72). First, the value of the PBA is set (74) equal to the value of the incoming LBA from the read or write request from the host computer. Next, a variable N (representing the particular alternate area of interest) is set (76) equal to one. Then a loop is performed in which first a test (78) determines if the PBA is greater than or equal to the first PBA in Alternate Area N. This can be performed by reference to the table 40. If the answer is no, then the loop is exited. If, however, the answer is yes, then the PBA is set (80) equal to the previous value of the PBA plus the size of the Nth Alternate Area) In other words, the value of the PBA is increased by the size of the Alternate Area. Next, the value of N is incremented (82) by one. Process flow then continues back to test (78) completing the loop so that the test (78) can determine if the PBA is greater than or equal to the first PBA in the next alternate area. This looping continues until the answer to this test (78) is no. At this point, process flow continues to a test (84) where it is determined if the PBA is on a defect list. If it is not, then the routine is ended (86) with a calculated value for the PBA. If, however, the PBA is on a defect list, then the PBA is set (88) equal to the PBA value in the defect list. The routine then ends (86).

As can be appreciated, the method and system of the present invention provides a means for allowing the number, size, and position of reserved alternate areas to be provided and configured at run time. This provides great flexibility for the disk drive system 10, and allows the design of disk drive systems to be simplified by using the routines described below to access the data stored in data structures such as the table 40.

While the invention has been particularly shown and described with reference to a preferred embodiment thereof, it will be appreciated by those skilled in the art that various other changes in the form and details may be made without departing from the spirit and scope of the invention. It should be understood that this description has been made by way of example, and that the invention is defined by the scope of the following claims.

The invention claimed is:

1. A method for configuring reserved alternate areas in an individual disk drive system for relocation of blocks thereto, the method comprising:

spinning up the individual disk drive system;

using firmware within the individual disk drive system, determining the configuration of the individual disk drive system after spinning up the individual disk drive system;

using the firmware, determining the number, size, and physical location of the reserved alternate areas based on the determined configuration; and storing the number, size, and physical location of the reserved alternate areas in memory.

2. A method as defined in claim 1, wherein the operation of determining the configuration includes determining a capacity of the disk drive system.

3. A method as defined in claim 1, wherein the operation of determining the configuration includes determining information about the number and location of read/write heads in the disk drive system.

4. A method as defined in claim 3, wherein the operation of determining the configuration includes detecting the number of read/write heads in the disk drive system.

5. A method as defined in claim 1, wherein the operation of determining the configuration includes reading configuration information from memory associated with the disk drive system.

6. A method as defined in claim 1, wherein the operation of determining the configuration includes reading an externally configurable input.

7. A method as defined in claim 1, wherein the operation of determining the configuration includes receiving information from a host computer.

8. A method as defined in claim 1, wherein the operation of determining the number, size, and location of the reserved alternate areas includes scaling the size to the capacity of the disk drive system.

9. A method as defined in claim 1, wherein the operation of determining the number, size, and location of the reserved alternate areas includes placing at least one reserved alternate area on each recording surface of the disk drive system.

10. A method as defined in claim 1, wherein the operation of determining the number, size, and location of the reserved alternate areas includes varying the size of the reserved alternate areas depending upon the radial location of the areas on disk media of the disk drive system.

11. A method as defined in claim 1, wherein the configuration is stored in the form of a table.

12. A method as defined in claim 11, further including factoring the stored configuration in memory into address calculations.

13. A method as defined in claim 12, wherein the operation of factoring includes a fixed routine that can perform the factoring based on the information stored in the table.

14. A method as defined in claim 1, further including factoring the stored information in memory into address calculations.

15. A controller for controlling a disk drive system, comprising:

control circuitry controlling configuration of reserved alternate areas in the disk drive system; and a memory device storing a data structure having an entry for each of the reserve alternate areas and further storing firmware operated by the control circuitry;

wherein after initial spinning up of the disk drive system, the firmware determines a capacity and a configuration of the disk drive system, determines a position and a size for each of the reserved alternate areas based on the capacity and the configuration of the disk drive system, stores the position and size in the entry in the data structure corresponding to each of the reserve alternate areas, and performs an addressing operation using the data structure.

16. The controller of claim 15, wherein each of the stored positions includes a physical block address of a beginning of a corresponding one of the reserved alternate areas and the size comprises a number of blocks.

17. The controller of claim 15, wherein the firmware determines the capacity of the disk drive system by reading capacity information from media in the disk drive system.

18. The controller of claim 15, wherein the firmware determines the configuration of the disk drive system by determining the number of read/write heads in the disk drive system.

19. The controller of claim 15, wherein the firmware determines the capacity or the configuration of the disk drive system by receiving information from a device in communication with the disk drive system.

20. A method for configuring reserved alternate areas in an individual disk drive system, the method comprising:

providing memory including a data structure for storing position and size data for the reserved alternate areas in the individual disk drive system;

providing firmware associated with control circuitry of the individual disk drive system for controlling reconfiguration of the reserved alternate areas;

spinning up the individual disk drive system;

with the firmware, determining a configuration and a capacity of the individual disk drive system after spinning up the individual disk drive system;

with the firmware, determining a number, a size, and a physical location of the reserved alternate areas based on the determined configuration;

storing for each of the reserved alternate areas, the size and the physical location in the data structure; and performing an address calculation using the size and the physical location in the data structure for at least one of the reserved alternate areas.

* * * * *